United States Patent [19]

Schiffleger

[11] Patent Number: 5,434,970
[45] Date of Patent: Jul. 18, 1995

[54] SYSTEM FOR DISTRIBUTED MULTIPROCESSOR COMMUNICATION

[75] Inventor: Alan J. Schiffleger, Chippewa Falls, Wis.

[73] Assignee: Cray Research, Inc., Eagan, Minn.

[21] Appl. No.: 655,296

[22] Filed: Feb. 14, 1991

[51] Int. Cl.$^6$ .............................................. G06F 15/16
[52] U.S. Cl. ................................ 395/200; 364/927.98
[58] Field of Search ................................ 395/200, 325

[56] References Cited

U.S. PATENT DOCUMENTS

| | | | |
|---|---|---|---|
| 3,735,360 | 5/1973 | Anderson et al. | 395/250 |
| 3,916,383 | 10/1975 | Malcolm | 395/650 |
| 4,128,880 | 12/1978 | Cray, Jr. | 395/800 |
| 4,280,176 | 7/1981 | Tan | 395/425 |
| 4,563,738 | 1/1986 | Klan | 395/325 |
| 4,636,942 | 1/1987 | Chen et al. | 395/725 |
| 4,661,900 | 4/1987 | Chen et al. | 395/800 |
| 4,745,545 | 5/1988 | Schiffleger | 395/325 |
| 4,754,398 | 6/1988 | Pribnow | 395/200 |

FOREIGN PATENT DOCUMENTS 0330836 9/1989 European Pat. Off. .
8304117 11/1983 WIPO .

OTHER PUBLICATIONS

Patent Abstracts of Japan, vol. 13, No. 700 (P-829) (3418) 17 Feb. 1989 and JP, A, 63257048 24 Oct. 1983 (see abstract).

Primary Examiner—David Y. Eng
Attorney, Agent, or Firm—Schwegman, Lundberg & Woessner

[57] ABSTRACT

A tightly coupled interprocessor communication system based on a common shared resource circuit and adapted particularly to a multiprocessing system including $2^N$ processors. A local control circuit is connected to each processor and a shared resource circuit is tightly coupled through the local control circuits to each processor. The shared resource circuit includes a shared semaphore register, a shared information register and a read and increment circuit which can be used to increment the contents of a shared information register as a single instruction. The local control circuit includes an issue control circuit used to determine when a transaction with the shared resource circuit is permitted, a circuit which generates a command to the shared resource circuit when the transaction is permitted and a real time clock.

10 Claims, 5 Drawing Sheets

| RESOURCE SUBCIRCUIT PLACEMENT | CLOCK PERIOD | | |
|---|---|---|---|
| | v | v+1 | v+2 |
| CPU 0 | $CMD^0 - CMD^3$ | $CMD^4 - CMD^7$ | $2^0 - 2^3$ |
| CPU 1 | $CMD^0 - CMD^3$ | $CMD^4 - CMD^7$ | $2^4 - 2^7$ |
| CPU 2 | $CMD^0 - CMD^3$ | $CMD^4 - CMD^7$ | $2^8 - 2^{11}$ |
| CPU 3 | $CMD^0 - CMD^3$ | $CMD^4 - CMD^7$ | $2^{12} - 2^{15}$ |
| CPU 4 | $CMD^0 - CMD^3$ | $CMD^4 - CMD^7$ | $2^{16} - 2^{19}$ |
| CPU 5 | $CMD^0 - CMD^3$ | $CMD^4 - CMD^7$ | $2^{20} - 2^{23}$ |
| CPU 6 | $CMD^0 - CMD^3$ | $CMD^4 - CMD^7$ | $2^{24} - 2^{27}$ |
| CPU 7 | $CMD^0 - CMD^3$ | $CMD^4 - CMD^7$ | $2^{28} - 2^{31}$ |
| CPU 8 | $CMD^0 - CMD^3$ | $CMD^4 - CMD^7$ | $2^{32} - 2^{35}$ |
| CPU 9 | $CMD^0 - CMD^3$ | $CMD^4 - CMD^7$ | $2^{36} - 2^{39}$ |
| CPU 10 | $CMD^0 - CMD^3$ | $CMD^4 - CMD^7$ | $2^{40} - 2^{43}$ |
| CPU 11 | $CMD^0 - CMD^3$ | $CMD^4 - CMD^7$ | $2^{44} - 2^{47}$ |
| CPU 12 | $CMD^0 - CMD^3$ | $CMD^4 - CMD^7$ | $2^{48} - 2^{51}$ |
| CPU 13 | $CMD^0 - CMD^3$ | $CMD^4 - CMD^7$ | $2^{52} - 2^{55}$ |
| CPU 14 | $CMD^0 - CMD^3$ | $CMD^4 - CMD^7$ | $2^{56} - 2^{59}$ |
| CPU 15 | $CMD^0 - CMD^3$ | $CMD^4 - CMD^7$ | $2^{60} - 2^{63}$ |

FIG. 4

| RESOURCE SUBCIRCUIT PLACEMENT | CLOCK PERIOD | | | | | | |
|---|---|---|---|---|---|---|---|
| | v | v+1 | v+2 | v+3 | v+4 | ... | v+10 |
| CPU 0 | $CMD^0 - CMD^3$ | $Aj^0 - Aj^3$ | $Aj^4 - Aj^7$ | $Ak^0 - Ak^3$ | $Ak^4 - Ak^7$ | ... | $Ak^{28} - Ak^{31}$ |
| CPU 1 | $CMD^0 - CMD^3$ | $Aj^0 - Aj^3$ | $Aj^4 - Aj^7$ | $Ak^0 - Ak^3$ | $Ak^4 - Ak^7$ | ... | $Ak^{28} - Ak^{31}$ |
| CPU 2 | $CMD^0 - CMD^3$ | $Aj^0 - Aj^3$ | $Aj^4 - Aj^7$ | $Ak^0 - Ak^3$ | $Ak^4 - Ak^7$ | ... | $Ak^{28} - Ak^{31}$ |
| CPU 3 | $CMD^0 - CMD^3$ | $Aj^0 - Aj^3$ | $Aj^4 - Aj^7$ | $Ak^0 - Ak^3$ | $Ak^4 - Ak^7$ | ... | $Ak^{28} - Ak^{31}$ |
| ... | ... | | | ... | | ... | ... |
| CPU 13 | $CMD^0 - CMD^3$ | $Aj^0 - Aj^3$ | $Aj^4 - Aj^7$ | $Ak^0 - Ak^3$ | $Ak^4 - Ak^7$ | ... | $Ak^{28} - Ak^{31}$ |
| CPU 14 | $CMD^0 - CMD^3$ | $Aj^0 - Aj^3$ | $Aj^4 - Aj^7$ | $Ak^0 - Ak^3$ | $Ak^4 - Ak^7$ | ... | $Ak^{28} - Ak^{31}$ |
| CPU 15 | $CMD^0 - CMD^3$ | $Aj^0 - Aj^3$ | $Aj^4 - Aj^7$ | $Ak^0 - Ak^3$ | $Ak^4 - Ak^7$ | ... | $Ak^{28} - Ak^{31}$ |

FIG. 5

SYSTEM FOR DISTRIBUTED MULTIPROCESSOR COMMUNICATION

BACKGROUND OF THE INVENTION

1. Field of the Invention

The present invention pertains to the field of high speed digital data processors and more particularly, to communication between processors in a multiprocessor system.

2. Background Information

Interprocessor communication is an important factor in the design of effective multiprocessor data processing systems for multitasking applications. System processors must be able to execute independent tasks of different jobs as well as related tasks of a single job. To facilitate this, processors of a multiprocessor system must be interconnected in some fashion so as to permit programs to exchange data and synchronize activities.

Synchronization and data transfers between independently executing processors typically are coordinated through the use of controlled access message boxes. A single bit semaphore is used to prevent simultaneous access to the same message box. In operation, a processor tests the state of the semaphore bit. If the semaphore bit is set, the message box is currently "owned" by another processor. The requesting processor must then wait until the semaphore is cleared, at which time it sets the semaphore and can access the message box.

A typical approach to interprocessor communication in prior art machines was to use main memory as the location of the message boxes and their associated semaphore bits. This "loosely coupled" approach minimizes interprocessor communication links at the cost of increasing the overhead for communications. However when the number of processors in a multiprocessing system increases, processors begin to contend for limited resources. For instance, accessing a "global" loop count stored in main memory and used to track iterations of a process executed by a number of different processors is relatively simple when there are only two or three processors. But in a loosely coupled system a processor's access to a global loop count contends with other processors' accesses to data in memory. These contentions delay all memory requests.

A different approach was disclosed in U.S. Pat. No. 4,636,942 issued to Chen et al. and in U.S. Pat. No. 4,754,398 issued to Pribnow, both of which patents are hereby incorporated herein by reference. The above documents disclose "tightly coupled" communication schemes using dedicated "shared" registers for storing data to be transferred and dedicated semaphores for protection of that data. Shared registers are organized to provide N+1 "clusters" where N equals the number of processors in the system. Clusters are used to restrict access to sets of shared registers. Processors are assigned to a cluster as part of task initialization and can access only those shared registers that reside in their cluster. A semaphore register in each cluster synchronizes access to cluster registers by processors assigned to the same cluster.

Tightly coupled communication schemes reduce communication overhead by separating interprocessor communication from the accesses to memory that occur as part of the processing of a task. However, even in tightly coupled systems, communication overhead increases as a function of the number of processors in a system. This increased overhead directly impacts system performance in multitasking applications. A large number of processors contending for a piece of data (such as a global loop count) can tie up even a dedicated communications path due to increased message traffic. This has been recognized and steps have been proposed to streamline communications in a tightly coupled system.

U.S. Pat. No. 4,754,398 discloses a method for reducing interprocessor communication traffic incurred in executing semaphore operations in a tightly coupled system. A copy of a cluster's global semaphore register is kept in a local semaphore register placed in close proximity to each processor in the cluster. Operations on a cluster's global semaphore register are mirrored in operations on the local semaphore registers associated with that cluster. The use of a local semaphore register reduces the delay between the issuance of a semaphore test command and the determination of the state of that semaphore.

Commonly owned, copending application Ser. No. 07/308,401 by the present inventor goes a step further by streamlining the local semaphore testing and by replacing the shared real time clock circuit with distributed local real time circuits. That application also extends the tightly coupled design to a system of eight processors. It is hereby incorporated by reference.

In the above system the shared semaphore and information register circuit is partitioned such that one byte of the 64 bit interprocessor communication system is located on each processor board. The bytes are distributed such that the least significant byte of each information register resides on CPU0 and the most significant byte on CPU7. Interprocessor communication commands are a single byte in length; these commands are replicated at the source so as to send the same command byte to each shared circuit in the system.

Global semaphore registers for the above system are distributed among the processors. Since each semaphore register is only 32 bits wide, the least significant byte of each semaphore register is kept on CPU4 and the most significant byte is kept on CPU7.

A local control circuit is placed on each processor board. This circuit receives a interprocessor communication instruction from the processor on the board and determines when to issue the instruction to the shared communication circuitry. In addition, the control circuit knows the cluster that the processor is assigned to and keeps a copy of the semaphore register associated with that cluster in its local semaphore register.

By software convention, a CPU wishing to access a shared information register must gain control of the semaphore associated with that register. First, the CPU issues a Test_and_Set instruction on the semaphore. If the bit is set, the local circuit halts the CPU until the bit clears and there are no other higher priority interprocessor communication requests. The local circuit then allows issue of the Test_and_Set instruction and the proper semaphore is set in the shared semaphore register and in each local semaphore register assigned to that cluster.

Once the semaphore bit is set the CPU can access its associated information register by issuing a Shared_Register_Read or Shared_Register_Write instruction. Upon completion of the necessary operations on the shared register, the CPU clears the semaphore bit in the shared semaphore register and the proper bit in the local semaphore registers assigned to that cluster are cleared. While the semaphore bit is set no other processor can access the associated information register.

As the number of processors increase, the methods disclosed to date are not adequate to meet the needs of systems having an increased number of processors. The steps required to access and control global variables such as loop counts stored in shared registers adds a significant burden to communications overhead. In the meantime, access to these registers by other processors in the cluster is not permitted. Processors requiring access to the loop count must wait until the semaphore bit is cleared. This has the potential to waste a considerable amount of CPU time.

It is clear that further changes are necessary in the design of a tightly coupled communication circuit to achieve reduced message traffic.

SUMMARY OF THE INVENTION

The present invention is a tightly coupled interprocessor communication system based on a common shared resource circuit and adapted particularly to a multiprocessing system including $2^N$ processors. A local control circuit is connected to each processor and a shared resource circuit is tightly coupled through the local control circuits to each processor. The shared resource circuit includes a shared semaphore register, a shared information register and a read and increment circuit which can be used to increment the contents of a shared information register as a single instruction. The local control circuit includes an issue control circuit used to determine when a transaction with the shared resource circuit is permitted, a circuit which generates a command to the shared resource circuit when the transaction is permitted and a real time clock.

According to another aspect of the present invention, a mechanism has been added to permit the use of indirect addressing in the addressing of semaphore bits and shared registers. Operating systems can relocate semaphore bits and message areas to permit simultaneous execution of the same function within a single task.

BRIEF DESCRIPTION OF THE DRAWINGS

FIG. 4 is a table illustrative of a write operation according to the present invention.

FIG. 5 is a table illustrative of an I/O channel operation according to the present invention.

DETAILED DESCRIPTION OF THE PREFERRED EMBODIMENT

In the following detailed description of the preferred embodiment, references made to the accompanying drawings which form a part thereof, and which is shown by way of illustration a specific embodiment in which the invention may be practiced. The preferred embodiment of the present invention is designed to operate within a tightly coupled multiprocessor system of sixteen processors. It is to be understood that other embodiments may be utilized and structural changes may be made without departing from the scope of the present invention.

Figure 1:
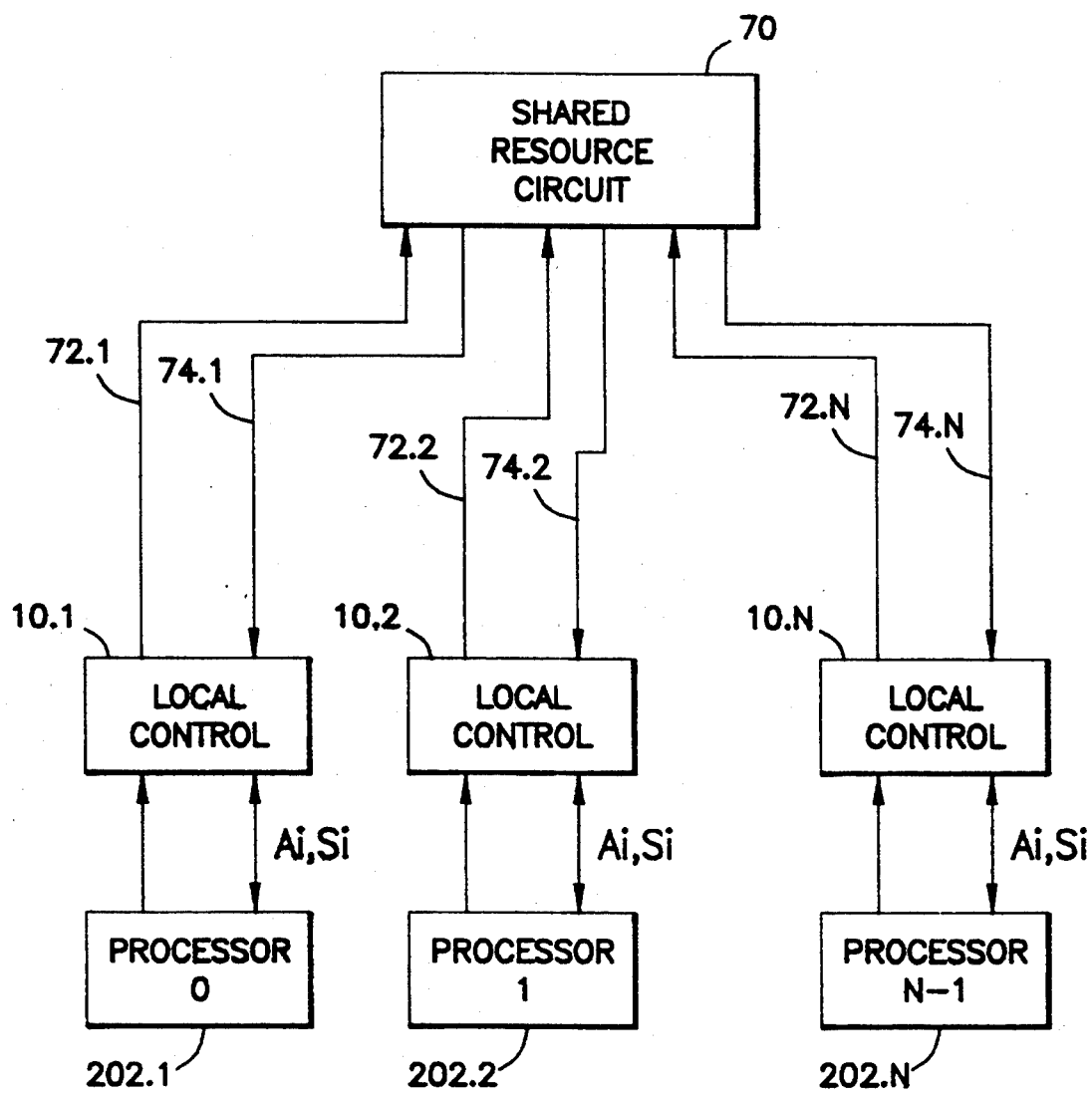
FIG. 1 is a high-level block diagram of a tightly coupled multiprocessor system according to the present invention.

FIG. 1 illustrates a high-level block diagram of the tightly coupled multiprocessor communication system 200 within a multiprocessor data processing system. Processors 202.1 through 202.N are connected to local control circuits 10.1 through 10.N, respectively. Local control circuits 10.1 through 10.N are connected in turn through shared register write paths 72.1 through 72.N and shared register read paths 74.1 through 74.N to shared resource circuit 70. In the preferred embodiment, paths 72 and 74 are 64 bits wide. Also, in the preferred embodiment, each local control circuit is placed on its associated processor's circuit board to ensure close proximity. This permits use of a separate instruction path and separate 64 bit address register and scalar register read and write paths to connect processors 202 to local control circuits 10.

Further, in the preferred embodiment shared resource circuit 70 is partitioned by bit-slicing the registers in circuit 70 into N equal subcircuits and duplicating the control circuits so as to create N autonomous subcircuits 71.1 through 71.N. One subcircuit 71 is then placed on a circuit board with a processor 202 and a local control circuit 10, reducing the number of circuit boards in the system.

Figure 2:
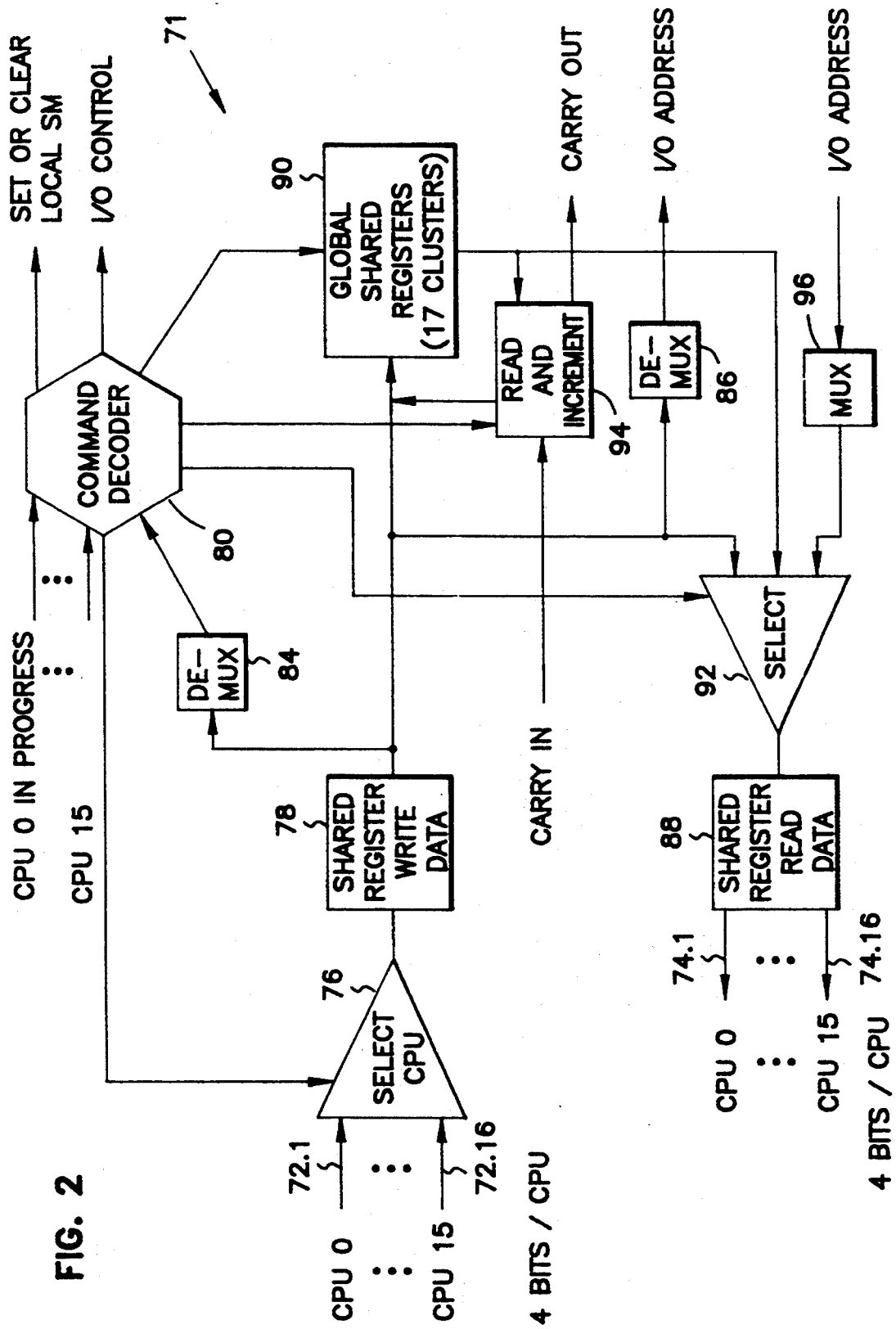
FIG. 2 is a block diagram of the common shared register resource circuitry according to the present invention.

FIG. 2 illustrates a shared resource subcircuit 71 for a multiprocessing system containing sixteen processors. Four bit lines from shared register write paths 72.1 through 72.16 are connected through write selector 76 to write registers latch 78. The four bits sent to each subcircuit 71 depend on the processor board that the subcircuit is placed on. In the preferred embodiment, subcircuit 71 placed on Processor M receives bits (M*4) through (M*4)+3 as shown in FIG. 4.

In a like manner, read registers latch 88 is connected to four bit lines from shared register read paths 74.1 through 74.16 for transferring data from the shared resource circuit 70 to the requesting processor 202.

Write registers latch 78 is connected to global shared registers 90, through command demultiplexer 84 to command decoder 80, through read registers selector 92 to read latch 88 and through I/O channel demultiplexer 86 to one or more I/O channels (not shown). I/O channel multiplexer 96 and shared registers 90 are also connected through read registers selector 92 to read latch 88. In addition shared registers 90 are connected to read and increment circuit 94 for automatically incrementing the contents of a register within shared registers 90.

In the preferred embodiment, shared registers 90 are segmented into N+1 clusters of sixteen information registers (eight shared B and eight shared T) and one semaphore register. Shared B registers are used to transfer addresses; shared T registers are used to transfer scalar data. Access to registers within each cluster is limited to those processors 202 that are assigned to that cluster.

Command decoder 80 is connected to write selector 76, shared registers 90, read selector 92 and read and increment circuit 94. Command decoder 80 decodes commands received from local control circuits 10.1 through 10.16 and controls the movement of data within resource subcircuit 71. Command decoder 80 also provides feedback to local control circuits 10.1 through 10.16 so they can modify their local semaphore registers to reflect changes in shared semaphore registers. In addition, command decoder 80 controls operation of the attached I/O channel.

Shared register write paths 72.1 through 72.N transmit commands and data to shared resource register 70. In the preferred embodiment, commands are either eight or twelve bits in length. Therefore, since each subcircuit 71 runs independently, the local control circuit 10 sending the command must replicate and send it to each of the subcircuits 71.1 through 71.N. For the sixteen processor case, the first four bits of a command from processor 202 are transferred on write path 72.1 to each subcircuit 71.1 through 71.16 at the same time. Then the next four bits are transferred, followed by the next four bits of command and data if required. Each subcircuit then reconstructs the command using command demultiplexer 84 before presenting the command to command decoder 80.

Local control circuits 10.1 through 10.N arbitrate among themselves to prevent more than one access to shared resource circuit 70 at a time. A local control circuit 10 uses a CPU_In_Progress line 32 to indicate that it has control of shared resource 70. In the preferred embodiment, each shared resource subcircuit 71.1 through 71.N is connected to a CPU_In_Progress line 32 from each local control circuit 10.1 through 10.N. The resulting N*N lines are used by the command decoder 80 on each subcircuit 71 to select (through write selector 76) the write path 72 associated with the requesting processor 202.

Figure 3:
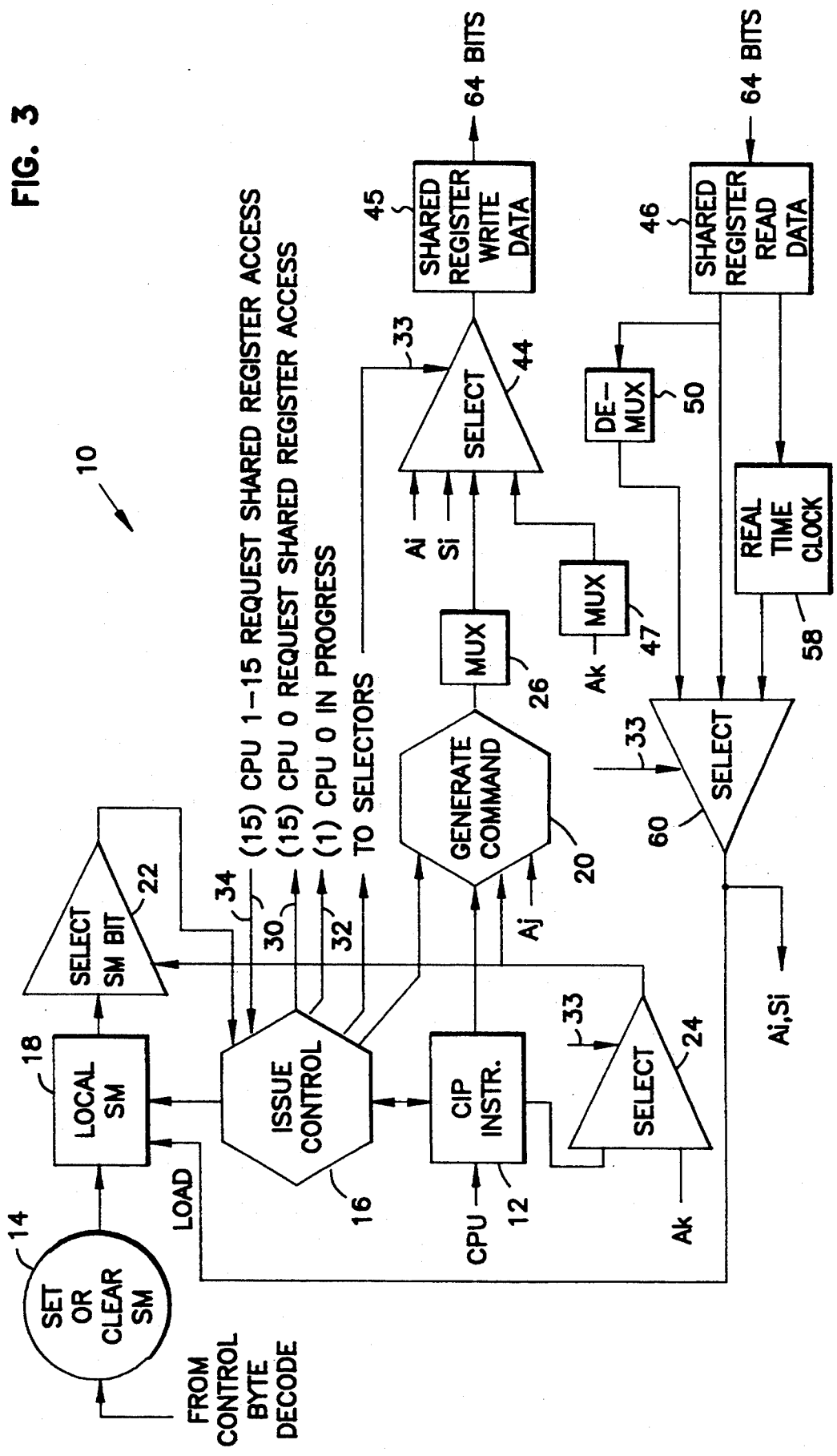
FIG. 3 is a simplified schematic block diagram of the local shared register access circuitry according to the present invention.

FIG. 3 shows an electrical block diagram of the local control circuit 10 of FIG. 1. Issue control 16 is connected to current instruction parcel (CIP) register 12, local semaphore register 18, semaphore selector 22, command generator 20 and, externally, to each of the other control circuits 10 and to shared resource circuit 70. Issue control 16 manages the issuance of instructions having to do with shared resource circuit 70. Through CIP register 12, issue control 16 receives instructions from its respective processor 202. Issue control 16, in turn, acts through semaphore index selector 24 to steer semaphore selector 22 with the contents of either CIP register 12 or of a processor 202 address register. The selected semaphore bit can then be tested by issue control 16 in the execution of a test and set instruction.

Issue control 16 generates a shared resource request 30 to each of the other local control circuits 10 and arbitrates received resource requests 34 from the other local circuits 10. Once it has gained control of shared resource circuit 70, issue control 16 asserts a CPU_In_Progress line 32 to shared resource 70 and causes command generator 20 to generate a command based on the contents of CIP register 12. In the preferred embodiment, the resulting command is multiplexed by command multiplexer 26 into two to three nibbles (four bits each) and sent to each subcircuit 71 of shared resource circuit 70.

Command generator 20 is connected to CIP register 12, to processor 202 address registers and, through command multiplexer 26, to write data selector 44. Write data selector 44 routes data from processor 202 scalar and address registers, from address register multiplexer 47 and from command multiplexer 26 through local write data latch 45 to write data path 72.

Data coming from read path 74 is latched in local read data latch 46. Real time clock 58 is connected to read data latch 46 to facilitate broadcast loading of an arbitrary start time. Read data selector 60 is connected to read data latch 46 directly and through read data demultiplexer 50 and to real time clock 58. Data from read data selector 60 can be stored to local semaphore register 18 or to processor 202 scalar and address registers. Semaphore register 18 can be loaded directly from selector 60 or modified one bit at a time through local semaphore modifier 14. Local semaphore modifier 14 is connected in turn to command decoder 80 for monitoring activity in the shared semaphore registers.

Issue control 16 controls movement of data through control circuit 10. Instructions are stored in CIP register 12 until issue control 16 determines that shared resource circuit 70 is ready to accept a command. Issue control 16 also controls data output by semaphore index selector 22, write data selector 44 and read data selector 60 through selector control 33.

As in the previously referred to copending application by the present inventor, each processor 202 is assigned a cluster number as part of loading a executable task into the processor. When the task is loaded, processor 202 registers the cluster number and requests and loads the semaphore register associated with that cluster into its local semaphore register 18. From that point on, the local control circuit 10 associated with that processor 202 maintains a copy of the assigned cluster's shared semaphore register in its local semaphore register 18.

Shared semaphore registers are used to synchronize activity and to restrict access to shared information registers. In one typical operation, an access to shared information registers begins with processor 202 issuing a "test and set" command to local control circuit 10. Local control circuit 10 then checks the status of the appropriate bit in its local semaphore register 18. If the bit is set, then another processor has control of that shared register and processor 202 waits for the bit to be cleared. If the bit is not set, local control circuit 10 asserts its CPU_In_Progress line 32 to each of the shared resource subcircuits 71 and sends a command to set the bit in the semaphore register for that cluster.

By software convention, setting a bit in the shared semaphore register grants control circuit 10 access to the associated shared information register. Control circuit 10 then has exclusive control to read or write that register. Upon finishing, control circuit 10 clears the set semaphore bit and another processor can access the register.

In the present invention, a new command has been added to further improve the efficiency of the computing system. Where in past machines a processor such as processor 202 tested a semaphore bit and then was required to wait until it cleared, the new command tests the semaphore bit, returns the status and branches to alternate instructions on determining that the bit is set. This frees up CPU cycles that were otherwise wasted waiting for access to a shared register shared by many CPUs.

This new "test and set or branch" instruction is useful at the operating system level in providing alternatives to just sitting and waiting for a system resource to free up. In previous systems, if two CPUs attempted to use the system resource, one CPU would gain control of the resource and the other would wait until it was finished. With the new instruction the second CPU can test for availability of the system resource. If the resource is busy, it can continue performing operating system functions. This permits a polling approach to system resources rather than the previous "get it or wait" approach.

Semaphore registers are 32 bits wide. To test a bit in local semaphore register 18, the contents of CIP register 12 are used to steer the appropriate bit through semaphore bit selector 22 to issue control 16. If the bit is clear, issue control 16 asserts a shared resource request 30 to each local control circuit 10 and compares its request to requests 34 received from other local control circuits 10. In the preferred embodiment, it has been determined that optimal access to shared resource circuit 70 is obtained when priority in accessing shared resource circuit 70 is granted to the processor 202 with the lowest CPU number while requiring that a processor 202 cannot assert a request as long as there is an active request 34 pending from a processor 202 with a higher CPU number. That is, in a sixteen processor system, CPU15 has the highest priority in making a request while CPU0 has the highest priority in getting an active request served. This provides an equal opportunity for all processors 202 to access shared resource 70. Once a request line 30 is set it remains set until the circuit 10 has completed its function, for example, until the data is transferred in a write operation or until the control information including the register address has been transferred to circuit 70 in a read operation.

Once a processor 202 has obtained access to the shared registers, command generator 20 is activated by issue control 16 to generate, in accordance with the operation specified in CIP register 12, two to three nibbles of command. This command is sent to each resource subcircuit 71 where it is received by command decoder 80 and used to control and accomplish the sought after operation. Command multiplexer 26 takes the first nibble generated by command generator 20 and sends sixteen replicas of that nibble on the sixty four bit wide write path 72. This is followed in subsequent clock periods by sixteen replicas of the remaining command nibbles. The active CPU_In_Progress line 32 causes command decoder 80 on each subcircuit 71 to select the write path 72 associated with the processor 202 controlling the shared register access. Each write registers latch 78 of each of the subcircuits 71 of FIG. 2 simultaneously receives the first four bits of the command followed in subsequent clock periods by the remaining nibbles. The command nibbles are reconstructed into a command in command demultiplexer 84 and presented to command decoder 80 for disposition. The command decoder 80 on each subcircuit 71 thus each simultaneously receives the control information necessary to control shared register access and, in particular, the addressing of the shared registers in shared registers 90.

In the preferred embodiment of the present invention, shared register and real time clock commands are two nibbles each. I/O, semaphore and cluster number commands are three nibbles each.

An example of a read operation will be described. As mentioned above, access to a shared register typically begins with a "test and set" instruction aimed at gaining control of the register. The local control circuit 10 associated with that processor 202 receives the instruction. It checks the local semaphore bit. If the bit is clear, control circuit 10 checks to see if a processor with higher CPU number has a request pending. If so, issue control 16 waits until the request clears before generating its own request. If not, issue control 16 generates a request. Next, issue control 16 checks its request against requests pending by other processors with a lower CPU number. If there are requests from processors with lower CPU numbers pending, issue control 16 waits until those requests clear. Once there are no requests from processors with lower CPU numbers, issue control 16 sets the CPU_In_Progress line 32 to each of the subcircuits 71 and activates command generator 20 to generate a command based on the contents of CIP register 12. The command generated contains the location of the bit in the semaphore register that is to be set. Multiplexer 26 replicates the three nibbles of the command and broadcasts them to each subcircuit 71 in successive clock periods.

Each subcircuit 71 contains a list of the clusters and the processors currently assigned to each cluster. This list is updated each time a processor is assigned to a new cluster. The command decoder 80 in each subcircuit 71 decodes the command and sets the appropriate bit in the shared semaphore register associated with the cluster the processor is assigned to. In addition, each command decoder 80 generates a signal to each local semaphore modifier 14 assigned to that cluster so that the copy of the shared semaphore register in its local semaphore register 18 is updated.

Once the semaphore bit is set, processor 202 issues a "read registers" instruction. The local control 10 generates a request as above. Once it has gotten control of shared resource 70, issue control 16 sets the CPU_In_Progress line 32 to each of the subcircuits 71 and activates command generator 20 to generate a command based on the contents of CIP register 12. The two nibble command includes the address of the desired register in shared registers 90. Multiplexer 26 again generates two nibbles that are sent to each subcircuit 71 in successive clock periods. Command decoder 80 in each subcircuit 71 decodes the command, reads the addressed register in the cluster the processor is assigned to, and writes the contents to read latch 88. Read latch 88 on each subcircuit 71 writes its four bit nibble to read path 74.1 through 74.N such that the four bits from each subcircuit 71 combine to form a single sixty-four bit word on each read path 74. This word is latched into read data latch 46 on the requesting local control circuit 10 and sent through selector 60 to the appropriate scalar or address register.

In a like manner, a write operation is performed on shared registers 90 beginning with distribution of the two control nibbles to each subcircuit 71 but followed on the next succeeding clock period by transmission of data from a selected address register $A_i$, a selected scalar register $S_i$ or the output of multiplexer 47. A write operation for a sixteen processor system is illustrated in FIG. 4. Since four bits of write path 72 are connected to each subcircuit 71, four bits of the sixty-four bit data word are written into write latch 78 and from there into shared registers 90. As can be seen in FIG. 4, in the first clock period, the four least significant bits of the command are transferred to the subcircuit 71 located on each processor board. In the next clock period, the remaining four bits of the command are transferred and in the following clock period the word to be written is transferred, with the bits distributed as shown in FIG. 4. Again, the destination cluster is determined by looking at the list of processor cluster assignments and the destination register is determined from the command.

The present invention permits indirect addressing of registers in shared resource 70. The ability to reassign registers is useful because operating systems can relocate semaphore bits and message areas to permit simultaneous execution of the same function within a single task.

In the preferred embodiment, instructions issued by processor 202 for shared resource access contain a three bit j field and a three bit k field. In previous machines the k field was concatenated to the end of the two least significant bits of the j field to form a pointer to the location of the semaphore bit for a semaphore instruction. This convention is still used in the present invention on semaphore instructions in which the most significant bit $j_2$ is cleared. However, if the most significant bit $j_2$ of the j field is set indirect addressing is enabled. This means the k field becomes a pointer to an address register $A_k$. Address register $A_k$ then contains the location of the semaphore bit that is to be acted upon.

In a like manner, in previous machines the j field was used to form an address to a register in the shared resource circuit for a register instruction. If the least significant bit $k_0$ of the k field is cleared in an instruction according to the present invention, this convention still holds. However, if the least significant bit $k_0$ of the k field is set in a register instruction, the j field forms a pointer to an address register $A_j$. Address register $A_j$ then contains the address of the register to be accessed. In either case, for indirect addressing, the contents of the address register becomes part of the command transmitted to shared resource 70.

A significant feature of the present invention is its ability to increment the contents of a shared B register "on the fly". This is important in eliminating steps required to increment a loop count in a task in which iterations of a loop are being performed by more than one processor. In previous machines, in order to perform a read and increment, a processor was required to issue a "test and set" instruction to grab control of the necessary shared B register. This was followed by issuing a "read register" instruction to read the contents of the register and place it in a processor register. There the processor performed the increment and then issued a "write register" instruction to place the loop count back in the original shared B register. The processor clears the semaphore bit.

In the present invention, this array of instructions has been replaced with a single "read and increment" instruction. The "read and Increment" instruction causes read and increment circuit 94 to capture the loop count as it is read from shared registers 90, increment it and write the result back into the same shared B register. This operation is performed as a single sequence of events, eliminating contention from processors seeking the same variable and, therefore, removing the requirement to grab control of the register via a "test and set" semaphore command. The "read and increment" function leads to a savings in clock periods that would offer significant advantages in multiprocessing applications.

In the preferred embodiment, the bit-slicing of shared resource 70 into subcircuits 71 means that each read and increment circuit 94 must propagate its carry to its next most significant neighbor. In reality, due to the speed with which the calculation must be performed in order to save the result, it is necessary to generate a propagate line that is sent to all cards with bits more significant than the current card. Since the shared B registers are limited to 32 bits located on processor boards 0 through 7, this means that CPU0 must generate a propagate to CPU1 through CPU7 and CPU7 must be capable of accepting up to seven propagate lines and determining from them if it must perform an increment of its internal four bits. Since it is desireable for the processor boards to be identical, the basic processor board must be able to handle any combination of up to seven Carry_Ins and seven Carry_Outs.

In the preferred embodiment, command decoder 80 contains the circuitry necessary to individually control the I/O channels associated with the processor 202 on whose board it resides. Command decoder 80 generates I/O control signals and I/O demultiplexer 86 provides I/O addresses. Since each I/O address is 32 bits wide and only four bits can be transferred to a subcircuit 71 at a time, a multiplexing scheme is used in which the I/O address is transferred four bits at a time for eight consecutive clock periods. Operation of an I/O channel is illustrated for the sixteen processor case in FIG. 5. On the first three clock periods, the command nibbles are broadcast to all subcircuits 71. As illustrated, the second and third nibble transmitted contain the I/O channel number obtained from an address register $A_j$. The index j is determined from the j field in the instruction in CIP register 12. Following that broadcast, in the subsequent eight clock periods, the I/O address is broadcast four bits at a time to all subcircuits 71. The I/O address is retrieved from an address register $A_k$. Again, the index k is determined from the k field in the same instruction in CIP register 12. Each subcircuit 71 examines the I/O channel number received and determines if the channel number belongs to a channel on its processor board. If so, command decoder 80 on that processor board activates the channel and transfers the received I/O address to that channel.

In a like manner, an I/O address can be read from an I/O channel, formed into eight nibbles by multiplexer 96 and read back through read registers latch 88. This I/O interface functionality gives each subcircuit 71 the ability to control the I/O channels on its processor board.

In the preferred embodiment, a real time clock circuit 58 is provided within each local control circuit 10. Clock circuit 58 can be read by an instruction placed in CIP register 12 or loaded through read data latch 46 with the contents of a processor 202 scalar register $S_j$ (where the index j is determined from the instruction in CIP register 12). Real time clock circuit 58 can only be loaded through shared resource circuit 70. Data from a scalar register $S_j$ on one of the processors 202.1 through 202.N is written through write registers latch 78 and read registers selector 92 to read registers latch 88. From there it is broadcast to the clock circuit 58 on each of local circuits 10.1 through 10.N. The new starting time is loaded to each of the real time clock circuits 58 within the same clock period.

Although the present invention has been described with reference to the preferred embodiments, those skilled in the art will recognize that changes may be made in form and detail without departing from the spirit and scope of the invention.

What is claimed is:

1. An interprocessor communication system for a multiprocessor data processing system having N processors, where N is an integer number greater than two, the interprocessor communication system comprising:
   (a) a shared resource circuit tightly coupled to the N processors, wherein the shared resource circuit includes a plurality of clusters, each cluster including a shared semaphore register and a plurality of shared information registers, including a first shared information register;
   (b) the shared resource circuit further including access control means for limiting access by each processor to a particular cluster of said plurality of clusters and autoincrement means, connected to said shared information registers, for automatically incrementing data read from the first shared information register of the particular cluster to form a result and for storing the result back into the first shared information register;

(c) each processor including means for issuing instructions to access the shared semaphore and the shared information registers in said shared resource circuit; and (d) N local control circuits, wherein each local control circuit is associated with and connected to a particular processor of the N processors, wherein the local control circuit associated with a particular processor is located in relatively close proximity to its associated processor as compared to said shared resource circuit, and wherein each of said local control circuits includes a local semaphore register, issue control means, connected to the instruction issuing means, for monitoring and controlling the issue of instructions requiring access to said shared resource circuit from the processor associated with said local control circuit, and data control means, connected to the local control circuit's associated processor, for transferring data from the associated processor to the first shared information register or from the first shared information register to the associated processor.

2. The interprocessor communication system according to claim 1 wherein each local control circuit further includes command means, connected to the issue control means, for developing a shared resource circuit command based on an issued instruction from its associated processor.

3. The interprocessor communication system according to claim 2 wherein each command means includes shared information register address means for indirect addressing of the shared information registers.

4. The interprocessor communication system according to claim 3 wherein each local control circuit further includes separate read and write paths connecting the local control circuit to said shared resource circuit.

5. The interprocessor communication system according to claim 4 wherein each processor further includes address registers and scalar registers and each write path includes multiplexer means for selectively placing the contents of one of said command means, said address registers and said scalar registers on said write path.

6. An interprocessor communication system for a multiple processor computing system, comprising:
a shared resource circuit comprising:
a shared information register; and
a shared semaphore register including a bit used to control access to said shared information register; and
a plurality of local control circuits, wherein each local control circuit is placed in close proximity and connected to an associated processor and wherein a local control circuit includes:
a current instruction parcel register for receiving instruction parcels from the associated processor;
a real time clock;
a local semaphore register;
shared semaphore register monitoring means for monitoring changes in the shared semaphore register and reflecting those changes in the local semaphore register;
local semaphore testing means for testing a bit in said local semaphore register;
an instruction issue control connected to said local semaphore testing means and to each of the other local circuits for monitoring requests for interprocessor communication from other local circuits and for enabling the issue of instructions from the current instruction parcel register as a function of the state of a bit tested in its local semaphore register and of the requests received from other local circuits; and
control generation means connected to said current instruction parcel register and said instruction issue control for converting issued instructions into a command, said control generation means including register address means for indirect addressing of the shared information register; and
interprocessor communication means connected to said plurality of local circuits, said shared information register and said shared semaphore register for transferring a command from one of said local circuits to said shared resource circuit in order to perform one of a group of functions including:
reading the shared information register;
writing the shared information register; and
loading the contents of the semaphore register into the local semaphore registers.

7. The interprocessor communication system according to claim 6 wherein the shared resource circuit includes autoincrement means, connected to the shared information register, for automatically incrementing data read from said shared information register and for storing the incremented data back into the shared information register and the group of functions performed by a command further includes the function of reading and incrementing the contents of the shared information register.

8. A data processing system, comprising:
$2^N$ processors, where N is a positive integer greater than 2;
$2^N$ local control circuits, wherein each local control circuit is associated with and connected to a particular processor and wherein each local control circuit is located in relatively close proximity to its associated processor as compared to the remaining processors;
a shared resource circuit tightly coupled through the local control circuits to the processors, wherein the shared resource circuit includes shared information registers used to store data to be accessed by each processor and shared semaphore registers used to control access to particular shared information registers and to synchronize activity between two processors;
wherein the common shared resource circuit is partitioned into $2^N$ resource circuit blocks such that an equal number of bits from each shared information register are placed in each resource circuit block and wherein each resource circuit block is placed in close proximity to a particular processor from the plurality of processors; and
wherein each local control circuit includes a current instruction parcel register, an issue control means, connected to the current instruction parcel register, for determining when an instruction can issue, command means, connected to said issue control means, for coordinating communication between the local control circuit and the shared resource circuit, a write path, connected to said command means, for transferring commands and data from the local control circuit to said common shared resource circuit and a read path, connected to the associated processor, the local semaphore register and the shared resource circuit, for transferring data from the shared resource circuit to said local control circuit.

9. The data processing system according to claim 8 wherein the command means comprises means, connected to said issue control means, for forming an interprocessor communication command from an issued instruction.

10. The data processing system according to claim 9 wherein each processor includes a processor register and wherein the command means further comprise means, connected to the processor register, for forming an indirect shared information register address from data stored in the processor register.

* * * * *